May 8, 1928.

E. W. SEAHOLM 1,668,736

REAR SPRING MOUNTING

Filed May 5, 1926

Inventor
Ernest W. Seaholm

Patented May 8, 1928.

1,668,736

UNITED STATES PATENT OFFICE.

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE.

REAR SPRING MOUNTING.

Application filed May 5, 1926. Serial No. 106,881.

My invention relates to improvements in spring suspension, and more particularly to the connections between the ends of the springs and the frame of a motor vehicle or the like.

The objects of the invention are to provide a connection between the springs and frame of a vehicle which will permit a limited universal flexing of the spring ends and withal be simple and durable and effectively lubricated and kept free from dust and other foreign matter.

Other objects will appear hereinafter.

In the drawing.

Similar numerals throughout the drawing refer to corresponding parts.

Figure 1:
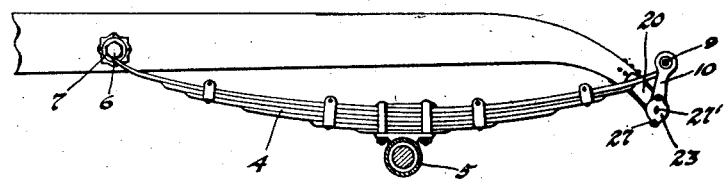
Figure 1 is a fragmentary detail view of the rear end of an automobile frame and the spring carried thereby illustrating the application of the invention thereto.

Referring to the drawing, there will be seen in Figure 1 an ordinary leaf spring 4 suitably secured to the axle 5, and having its forward end attached to the frame in the usual manner, that is, by a bolt 6 passing through the eye 7 of the spring. Bolted to the other eye 8 of the spring 4 by the bolt 9 is the swinging link or shackle 10 of the joint which is preferably made as indicated in Figure 2 and has a lower extension 11 provided with a cylindrical opening 12 and a pair of bolt holes 13.

Figure 2:
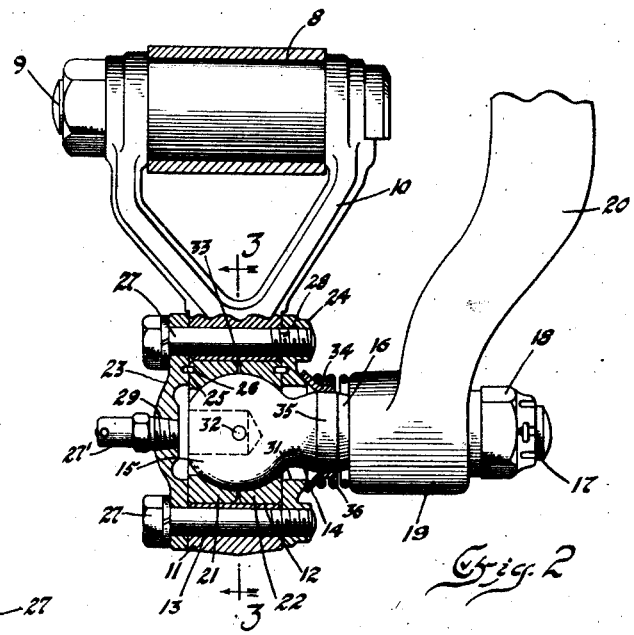
Figure 2 is an enlarged partly sectional view of the spring connection joint illustrating in detail the construction of the joint.
Figure 3:
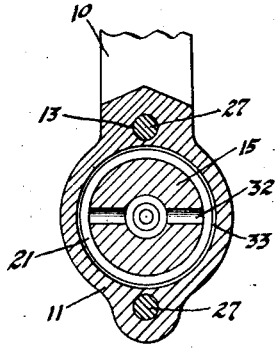
Figure 3 is a detail sectional view of the joint taken at the line 3—3 of Figure 2.

The numeral 14 designates another cooperating member of the joint which is shown as a stud 14 having a substantially spherical head 15, and a tapering shank portion 16 which terminates in a threaded portion 17 and nut 18 whereby the said pin is fastened to the arm 19 of the bracket 20, as shown in Figure 2. Seated within the opening 12 is a spherical bearing comprising a pair of semi-spherical bearings or complementary annular members, 21 and 22. Cover plates 23 and 24 provided with dowel pins 25 which engage with registering apertures 26 formed in the side of the said bearing, retain the later in fixed position within the said opening 12, and the covers are secured to each side of the cylindrical opening by bolts 27 passing through the holes 13 and suitably secured in threaded apertures 28 provided in the cover 24, or in any other suitable manner, as may be desired.

The cover 23 is formed with a threaded aperture 29 to receive a lubricant nipple 27, and the cover 24 is provided with an aperture 31 of sufficient diameter to provide proper clearance for the stud 14.

The head 15 is shown with a recess formed in the end which serves as a lubricant reservoir as indicated in dotted lines (see Figure 2) and an orifice 32 is drilled from said recess to the side of the head.

An annular dust cap 34 is mounted on a collar of the stud and covers the opening surrounding the shank of the pin, being yieldingly held in place by a spring 36 bearing against the cap and the face of said extension 19. By such an arrangement the aperture 31 is always kept closed, and thus as the joint functions, any dust or grit which otherwise would gain admission to the engaging parts is excluded.

From the foregoing, it will be seen that I have provided an arrangement, construction, and combination of various parts which fully attain the various objects of the invention hereinbefore mentioned. Modifications of the above may be made within the scope and spirit of my invention.

I claim:

1. A spring suspension for vehicles, including a stud fixedly attached to the vehicle frame and having its outer end formed with a hollow perforated ball, a swinging member suspended from one end of the spring of the vehicle and constructed with a socket adapted to receive the said perforated ball, a substantially spherical bearing for the said ball comprising a pair of complementary annular bearings, a pair of plates to hold the bearings in stationary position within the said socket, one of the said plates freely permitting the rocking of the shank of the said stud therethrough, means associated with the last named plate for forcing a lubricant into the cavity of the said ball and out over its surface, and means associated with the other plate to close the opening surrounding the shank of the stud when the same is forced to assume maximum angular positions, whereby grit is excluded from the said engaging parts.

2. In an automobile spring suspension, a combination with a longitudinal frame, of a fixed stud carried by the said frame having its outer end formed with an open perforated hollow knob, a swinging member suspended from one end of the automobile spring and formed with an opening adapted to receive the said knob, a pair of complementary interchangeable quarter spherical bearings arranged in the said opening for engagement with the said knob, a pair of plates provided with dowel pins for anchoring the said bearing members in stationary position within the said opening, means carried by the plate adjacent the open end of the knob for flowing lubricant through the apertures in the said knob and out into the said bearings, and means for yieldingly maintaining closed an opening surrounding the stud at the point of its projection from the other of the said plates whereby dust and grit are excluded from admission.

3. In an automobile spring suspension, the combination with a longitudinal frame, a hollow, substantially globular stud rigidly mounted to the said frame and formed with perforations through its spherical surface for the distribution of a lubricant therethrough, a swinging member pivotally arranged in the eye of the said springs provided with a cylindrical opening adapted to receive the said pivot, a pair of complementary spherical bearings arranged in the said cylindrical opening for engagement with the said globular pivot, and means to retain the said bearings in fixed position within the said opening comprising a pair of plates, one plate of which having a lubricant distributing means to direct lubricant into the interior of the said pivot and out through the said perforations to the surface of the said bearings.

4. The combination with a vehicle, frame, of a stud fixedly carried by the said frame, and terminating in a ball like member, a swinging member pivotally suspended from one end of the spring and formed with a cylindrical opening adapted to receive substantially spherical bearings comprising a pair of complementary annular members between which the said ball is positioned, a pair of plates for retaining the said members in fixed position within the said opening, but permitting the free passage of the shank of the said ball through one of the said plates, means carried on the shank of the said stud for yieldingly maintaining closed the open space surrounding the shank of the pin when the same is forced to assume various angular positions.

In testimony whereof I affix my signature.

ERNEST W. SEAHOLM.